May 6, 1952        J. SWISS ET AL        2,595,727

ORGANOSILOXANES CONTAINING METHALLYL SILICON OXIDE GROUPS

Filed March 9, 1945

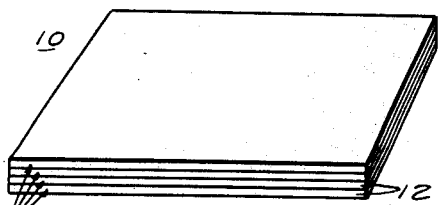

Fig.1.

Inorganic material impregnated with polymerized methallyl silicon compound or interpolymer thereof.

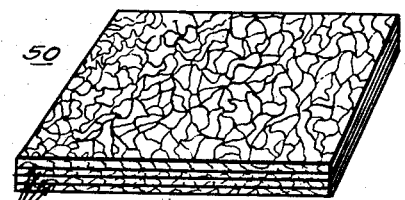

Fig.5.

Mica flakes bonded with polyermerized allyl silicon compound or interpolymer thereof.

Fig.2.

Insulating coating comprising polymerized methallyl silicon compound or interpolymer thereof.

Fig.3.

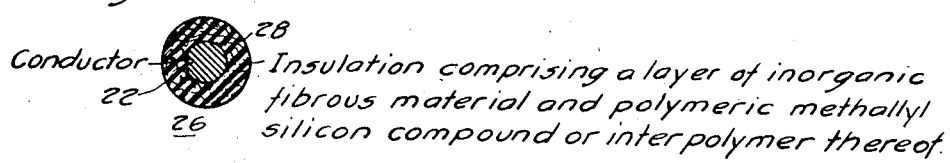

Conductor — Insulation comprising a layer of inorganic fibrous material and polymeric methallyl silicon compound or interpolymer thereof.

Fig.4.

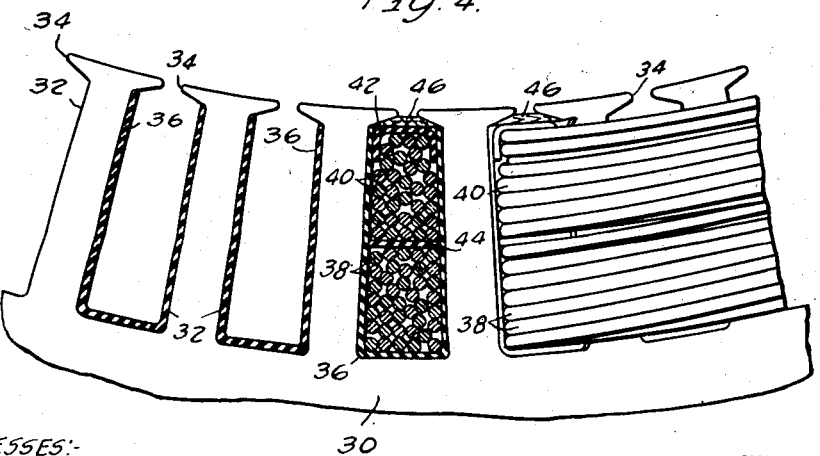

WITNESSES:-

INVENTORS
Clyde E. Arntzen and
Jock Swiss.
BY
ATTORNEY

Patented May 6, 1952

2,595,727

UNITED STATES PATENT OFFICE 2,595,727

ORGANOSILOXANES CONTAINING METHALLYL SILICON OXIDE GROUPS

Jack Swiss, McKeesport, and Clyde E. Arntzen, Pittsburgh, Pa., assignors to Westinghouse Electric Corporation, East Pittsburgh, Pa., a corporation of Pennsylvania Application March 9, 1945, Serial No. 581,836

4 Claims. (Cl. 260—46.5)

1

This invention relates to organosilicon compounds, their preparation and use. More particularly, this invention is concerned with new and useful substances comprising organic compounds of silicon having unsaturated organic groups attached to the silicon atom.

It is well known in the art that certain organosilicon compounds may be prepared by attaching saturated organic groups to silicon atoms. A number of such silicon compounds have been prepared by replacing one or more of the ethoxyl radicals in ethyl silicate, for example, with various alkyl or aryl groups. Saturated organosilicon compounds thus prepared with one, two or three saturated organic radicals attached to the silicon atom can be hydrolyzed to form the corresponding organosilicols which, in turn, dehydrate spontaneously or can be dehydrated to form polymeric silicon oxides or siloxanes. The organosilicon oxide polymers are characterized by silicon-oxygen bonds. The silicon-oxygen bond is capable of withstanding much higher temperatures than conventional organic bonds such as carbon-to-carbon or carbon-to-oxygen and the like as found in most organic compounds. Consequently, the siloxanes are excellent for use in applications subjected to elevated temperatures at which resins composed of ordinary organic compounds cannot be employed.

It is also known that the siloxanes containing saturated organic groups may be prepared and polymerized to form polymers having almost any desired degree of hardness or elasticity. The most useful organosilicon oxide polymers commercially, however, are those having good flexibility. Experience with the flexible organosilicon oxide polymers shows that they have excellent thermal properties but they lack resistance to hydrocarbon solvents, oils and other chemicals. For example, a flexible sheet of a saturated organic siloxane such as methyl siloxane when immersed in toluene will swell in a short time and when removed from the toluene will be found to crumble readily when manipulated. This shortcoming greatly limits the possible applications of the saturated organosilicon polymers.

A further drawback in connection with the saturated organosilicone oxides is encountered in preparing solid polymers from low silicon oxide polymers. The low silicon oxide polymers, which are usually fluids, require excessive times and temperatures to convert them into higher solid polymers. In nearly all cases, the conversion to a solid polymer requires more than 6 hours at 250° C.—often as much as 50 hours at 250° C. is

2 necessary for this purpose. This is not only time-consuming, but is costly as well.

The object of this invention is to provide for preparing novel unsaturated organosilicon compounds.

A further object of the invention is to provide for producing methallylsilicon compounds.

Another object of the invention is to provide for preparing polymeric bodies from methallylsilicon compounds.

A still further object of this invention is to provide for preparing interpolymers of methallylsilicon compounds and saturated organic silicon compounds.

Other objects of the invention will, in part, be obvious and will, in part, appear hereinafter.

For a fuller understanding of the nature and objects of this invention, reference should be had to the following detailed description and drawing, wherein:

Figure 1 is a view in perspective of a laminated member impregnated with a polymerized methallylsilicon compound;

Figs. 2 and 3 are greatly enlarged views in cross-section of conductors carrying an insulating coating of polymerized methallylsilicon compound;

Fig. 4 is a fragmentary view partly in section of a cross-section of a dynamoelectric stator; and Fig. 5 is a view in perspective of a laminated sheet of mica flakes.

This application is a continuation-in-part of our copending patent application Serial No. 514,372, filed December 15, 1943, entitled "Organo-Silicon Compounds and Products Thereof," now abandoned.

According to this invention, we have produced methallylsilicon compounds having the following unit structure:

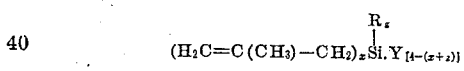

where $x$ is a number from 1 to 3; R is a saturated alkyl or aryl radical; $z$ is a number from 0 to 2; the sum of $x$ and $z$ not exceeding 3; and Y represents ethoxyl, hydroxyl, chlorine, or oxygen, or like radicals.

In copending patent applications, we have disclosed other allylsilicon compounds. In our copending patent application, Serial No. 581,839, filed March 9, 1945, and entitled "Organo-Silicon Compounds and Products Thereof," we have disclosed allylphenylsilicon compounds including both the phenyl and substituted phenyl radicals.

In our copending application Serial No. 581,837, filed March 9, 1945, entitled "Organo-Silicon Compounds and Products Thereof," we have disclosed allylsilicon compounds such, for example, as allylsilicon triethoxide and diallylsilicon diethoxide. In our parent case above referred to, we have described the preparation of allylmethylsilicon diethoxide and the preparation of various derivatives thereof. Also, in our copending patent application Serial No. 581,838, filed March 9, 1945, entitled "Organo-Silicon Compounds and Products Thereof," we have disclosed the preparation of allylmethylsilicon compounds and various derivatives and products thereof.

In the general preparation of allylsilicon compounds, it is convenient to start with either ethyl orthosilicate or silicon tetrachloride and to treat either of these with a Grignard reagent to substitute the desired methallyl and saturated organic groups for the ethoxyl or chlorine radicals attached to silicon. The following illustrative examples are given in order that those skilled in the art may better understand how the present invention may be carried out.

*Example I*

A mixture of 7.0 moles of methallyl chloride and 10.5 moles of ethyl silicate was added, with stirring, over a period of fourteen and three-fourths hours, to 9.0 gram atoms of magnesium in 75 cc. of ether. The liquid was then removed, by distillation under reduced pressure, from the salts formed in the reaction and was fractionally redistilled under reduced pressure. The novel compounds methallylsilicon triethoxide and dimethallylsilicon diethoxide as obtained by a second redistillation under reduced pressure, boiled at 100.8–101.8° (corr.) at 40 mm. and 122–122.5° (corr.) at 40 mm., respectively. The index of refraction and the density of the methallylsilicon triethoxide were found to be: $N_D^{25}$ 1.4122 and $d^{25}$ 0.8999. The index of refraction and the density of the dimethallylsilicon diethoxide were found to be: $N_D^{25}$ 1.4387 and $d^{25}$ 0.8828. Chemical analyses showed that the composition of the material boiling at 100.8–101.8° (corr.) at 40 mm. was $C_4H_7Si(OC_2H_5)_3$ and that of the material boiling at 122–122.5° (corr.) at 40 mm. was $(C_4H_7)_2Si(OC_2H_5)_2$.

The technical advantage obtained by preparing the methallylsilicon ethoxides resides in the fact that their boiling points are well separated from one another and from the boiling point of ethyl silicate. By contrast, allylsilicon triethoxide, diallylsilicon diethoxide, and ethyl silicate have the respective boiling points of 175.8° C., 188.5° C., and 166° C. Tedious distillation is required to separate these latter compounds from one another. With the compounds of this invention, the ethyl silicate is almost completely separated from the methallyl silicon ethoxide in one distillation and thereafter the methylallyl compounds are readily and easily fractionally separated by a simple distillation.

The methallylsilicon ethoxides of Example I can be further treated with a Grignard reagent to introduce methyl, phenyl, chlorophenyl, fluorophenyl, and other alkylphenyl radicals into the compound by replacing one or two ethoxyl radicals on the silicon atom.

In a similar way the methallylsilicon chlorides may be prepared. The various methallylsilicon ethoxides and methallylsilicon chlorides may be polymerized directly to form resinous bodies by heating in the presence of a catalyst capable of polymerizing vinyls. By admixing 2% tert-butyl perbenzoate to methallylsilicon triethoxide and heating on a flat surface at about 100° C., hard transparent resinous films are produced. Mixtures of the methallylsilicon ethoxides may be similarly polymerized. In addition, allyl esters, such as allyl phthalate or allyl carbonate may be admixed with the methallylsilicon ethoxides, and in the presence of a polymerizing catalyst and heat, hard transparent films are produced. The methallylsilicon ethoxide resinous films so produced were not appreciably affected by oils and hydrocarbon solvents.

Products that are potentially more useful than the methylallyl ethoxides are prepared first by hydrolyzing the methallyl ethoxides to form silicols, and the silicols then dehydrated or condensed to form methylallyl siloxanes. The following equation using dimethallylsilicon diethoxide represents the successive hydrolysis and dehydration reactions:

$[CH_2=C(CH_3)-CH_2]_2Si(OC_2H_5)_2 + 2H_2O \longrightarrow$
$\qquad [CH_2=C(CH_3)-CH_2]_2Si(OH)_2 + 2C_2H_5OH$
(Dimethallyl siliconediol)

$[CH_2=C(CH_3)-CH_2]_2Si(OH)_2 \longrightarrow$

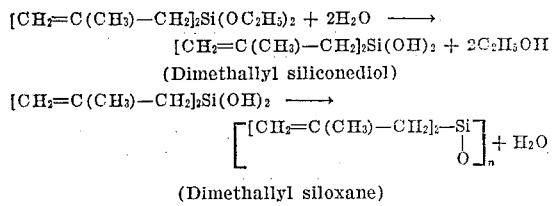

(Dimethallyl siloxane)

For many commercial purposes it is not necessary to separate or isolate the individual methallylsilicon compounds. Mixtures in which there are combined any predetermined proportion of two or more methallylsilicon compounds may be hydrolyzed to silicols and dehydrated to siloxanes. The silicon monomers may be so proportioned as to provide for predetermined properties not possessed by a polymer prepared from any one substantially pure methallylsilicon compound.

The methallyl silicols or partially condensed silicols may be isolated by fractionation, if desired. Also, the partially condensed silicols may be polymerized with a vinyl type catalyst in a manner similar to that pointed out in connection with the methallylsilicon ethoxides.

During the dehydration of the methallyl silicols, a molecule of water is eliminated between two hydroxyl groups and condensation takes place to form polymers having alternate silicon-oxygen bonds. The dehydration is preferably carried out in the presence of a dehydrating agent, particularly materials capable of absorbing or chemically combining with water. Boric acid esters, such for example, as methyl borate, metal halides, the oxides and halides of phosphorus, sulphuric acid and hydrochloric acid have been found to be suitable dehydrating agents. Heating is advised in order to expedite the dehydration.

The nature of the products produced by the condensation reaction with the formation of silicon-oxygen bonds is greatly determined by the kind and proportion of hydrolyzable groups present in the silicon compound being converted to the siloxane. Thus, when hydrolyzed and then dehydrated, the triethoxides form three dimensional polymers and the diethoxides form linear polymers while the monoethoxides can form only a single silicon-oxygen linkage and therefore tend to terminate a polymer chain. Consequently, a mixture containing a high proportion of the monoethoxide will tend to produce relatively small silicone polymer units. On the other hand, a large proportion of the triethoxide will tend to the formation of solid, high softening, crosslinked polymers. However, for most purposes a flexible polymer with a moderate amount of cross-linkage is preferred. This last type of polymer is characterized by a large proportion of molecules containing two organic groups attached to silicon. In commercial work, the polymers are usually composed of unseparated mixtures of two or three different silicon compounds. By proper proportioning of the components, through control of the reactions, mixtures may be secured having a predetermined variety of properties over a wide range of choice.

In general, the dehydration of the methallyl siloxanes is carried out initially only to the extent that a liquid which is still solvent soluble is produced. As condensation is prolonged, particularly with heating, thick gummy masses or solids result.

The outstanding advantage of the methallyl siloxanes of this invention is that the polymers have been found to overcome the shortcomings of saturated organosilicon oxide polymers, particularly improving the poor solvent resistance. Further, unexpected and highly desirable results are obtained when methallyl siloxanes are combined with the saturated organic siloxanes. The solid polymeric methyl siloxanes, ethyl siloxanes, phenyl ethyl siloxanes and phenyl methyl siloxanes and similar saturated alkyl and aryl organosilicon polymers have been greatly improved in their physical and chemical properties by the addition of small amounts of the methallyl siloxanes, particularly when combined so that interpolymers or copolymers are formed. Siloxane interpolymers containing from about 0.1% to 10% by weight of methallyl siloxane form flexible resinous bodies such as films, coatings, sheets and the like, characterized by extraordinary heat stability, resistance to hydrocarbon solvents, oils and water and resistance to deterioration from oxygen and other usually harmful substances. If 0.1% by weight of a methallyl silsesquioxane be admixed with 99.9% by weight of a diethyl siloxane, there will be present in the mixture 0.1 mole per cent of the methallyl silsesquioxane and, consequently, 0.1% of the total number of silicon atoms will have methallyl radicals directly attached thereto by C-Si bonds. About 1% to 2% of the methallyl siloxane in the interpolymers has given pronounced improvement in characteristics. In other cases, as much as 50% of the weight of the interpolymers may be composed of methallyl siloxane with highly advantageous results. The methallyl groups enable cross-linking through the unsaturated group in the methallyl radical whereby the molecules are linked by strong primary valence forces.

The saturated organic component of the siloxane interpolymers may be a siloxane derived by hydrolyzing and then dehydrating a saturated organic silicon compound having the unit structure

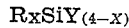
$R_xSiY_{(4-x)}$ where R is a saturated alkyl or aryl radical, X is from 1 to 3 and Y is a halide, ethoxide or other hydrolyzable group. Since the silicon compounds are not always pure single compounds, but are usually mixtures, X may be other than a whole number. For most purposes, a certain low minimum of the compound where X is 3 is desired. The interpolymers may be prepared by admixing the saturated organic silicon compounds with any or all of the methallyl silicon compounds herein disclosed. Other allylsilicon compounds such as are disclosed and described in our other copending patent applications hereinbefore mentioned may be admixed with the methallylsilicon compounds of the instant invention. The admixing may be accomplished either with the siloxanes as liquids of a low degree of polymerization or with solutions of either or both in a solvent. It is believed that better results are obtained, however, if the saturated organosilicon ethoxides are admixed with the methallylsilicon ethoxides (or the corresponding silicon halides) and hydrolysis and dehydration is carried out thereafter upon the mixture. The following is a typical example of the procedure for producing interpolymers:

*Example II*

To 36.3 cc. (0.15 mole) of methallylsilicon triethoxide, 60.0 cc. (0.30 mole) of methylsilicon triethoxide and 97.4 cc. (0.55 mole) of dimethylsilicon diethoxide was added 450 cc. of toluene. Then 100 cc. of 5 per cent sulfuric acid was added dropwise with stirring. During the addition, which required one hour, the temperature of the reaction mixture was maintained at 20° C. to 25° C. by running cold water over the outer surface of the flask.

The toluene layer was separated and the initial polymer was condensed by successive treatments with 100 cc. portions of 50%, 60%, 70%, and 75% sulfuric acids. After each addition of acid, the mixture was stirred for 30 minutes, hydrolyzed by addition of 200 grams of crushed ice followed by 1000 cc. of water and finally the toluene layer was separated and dried over anhydrous calcium chloride. In the resulting siloxane 15% of the silicon atoms had methallyl groups directly attached thereto.

The resulting polymer dried in less than two hours at 250° and was not visibly affected by immersion for 18 hours in transformer oil at 110° C. A commercial methyl silicon oxide polymer required 14 hours at 250° for drying and swelled and cracked on being immersed in the transformer oil for 18 hours at 110° C.

One of the outstanding properties, from a practical viewpoint, of the interpolymers of a methallyl silicon compound and a saturated organic silicon compound is the greatly improved drying time. For example, a methyl siloxane may require heating as much as 50 or 100 hours at 200° C. and 12 hours and more at 250° C. to produce a dry film of the polymer. By comparison, the interpolymers of saturated organic silicon compounds with as little as 1% of the methallyl silicon compound can be dried tack-free in about three hours at 200° C. and in much less time at 250° C. Obviously, this improvement in drying times at these temperatures enables the more economical application of the polymers in preparing various types of apparatus. Not only is the processing more rapid, but the life of the resulting resinous polymer is not affected by the disproportionate drying times as previously required with saturated organosilicon oxides alone.

Small additions of methallylsilicon compound when copolymerized with saturated alkylsilicon compounds, such as methylsilicon compounds, expedite fast setting or drying at lower temperatures. For example, 16 mol per cent of methallyl siloxane forming a copolymer with a methyl siloxane will lower the setting temperature from 200° C. to 120° C. for a given heating period. This product is similar to that in Example II, and the copolymer proportions are based on an empirical formula of the form $R_xSiO_y$, the sum of $x$ and $2y$ being 4, and therefore the mol proportions are directed to the number of silicon atoms to which the methallyl radicals and methyl radicals, respectively, are directly attached by C—Si bonds. The benefits of a lower setting temperature are particularly desirable since it has been found that higher setting temperatures frequently result in the oxidation of the base member to which the siloxane resin is being applied with the resultant weakening of the bond between the resin and the member.

A still further advantage which is secured by copolymerizing methallylsilicon compounds with saturated alkyl siloxanes is the improvement in physical properties at high temperatures. A body consisting of a dimethyl siloxane resin is barely able to support its own weight at 200° C. A hydrolyzed and condensed copolymer of 33% methallylsilicon triethoxide and 67% dimethylsilicon diethoxide has been found to be structurally strong at 200° C., whereby it can support a considerable load without failure.

In preparing the interpolymers of saturated organic silicon and methallylsilicon compounds, it has been found that a desirable process to follow is initially to hydrolyze a mixture in predetermined proportions of the respective saturated organic silicon esters, and the methallylsilicon esters. The hydrolysis product is then dehydrated and partially polymerized, for example, by heating for a short period of time until a relatively viscous liquid or gumlike mass is produced, but the polymerization should not be carried out to that extent that the mass is rendered insoluble in a hydrocarbon solvent such as toluene. Toluene or other hydrocarbon solvent is then applied to the partially polymerized mass to produce a liquid varnish suitable for application to members. Such varnish will be relatively fluid and capable of readily penetrating the pores and interstices of various fibrous or porous base members.

The methallyl siloxane or its interpolymers need not be dissolved in a solvent, but may be dispersed or emulsified in a volatile liquid carrier such as water. For this purpose, the water is rendered alkaline with ammonia, for example, and a dispersing agent added such, for instance, as a sodium alkyl sulfonate ester. Hydrolyzed polyvinyl esters and a simple alcohol, such as ethyl alcohol, may be present in small amounts to facilitate dispersion of the siloxane polymer and to render the dispersion more stable. The fluid siloxane polymer admixed with the water and the conditioning agents is passed through a suitable dispersing device, such, for example, a colloid mill, to break up the siloxane into finely divided particles and to establish a stable emulsion. By employing water, there is a great reduction in fire hazard.

In either event, a low viscosity siloxane solution in a volatile liquid carrier is secured. After applying to a suitable base material, usually an inorganic substance, the varnish or dispersion is subjected to drying to remove the volatile liquid carrier, such as water or the hydrocarbon solvent. The viscouse or gumlike siloxane interpolymer will be retained by the pores or interstices of the materials whereby it will not exude or escape during further processing. When the base material is more or less completely processed, as by cutting, shaping, bending, compacting or stretching, and the like, the silicon oxide interpolymer impregnant may be more completely polymerized to a state in which it is hard and resistant to solvents, while maintaining a predetermined flexibility.

In some cases, interpolymers may be prepared by dehydrating and partially polymerizing saturated alkyl or aryl silicols to low polymer siloxanes which are quite fluid and mixing them with methallyl siloxanes also dehydrated and partially polymerized to about the same extent so that they are miscible liquids. Further polymerization may then be carried out on the mixture. If the mixing of the partial polymers is difficult due to the fact that they may be rather viscous, they can be dissolved in a hydrocarbon solvent and interpolymerization may then be accomplished on the mixture to produce the solid siloxanes. It will be appreciated that a less intimate blending of the methallylsilicon molecules and the saturated organic silicon molecules is obtained by these latter procedures.

Referring to Fig. 1 of the drawing, there is illustrated a laminated member 10 produced according to the process disclosed herein. Each of the plurality of laminations 12 of the body 10 may be of any suitable inorganic material, such as glass fibers in the form of cloth, felt, tape, or the like, or an asbestos cloth or felt or asbestos paper, or other inorganic body. For highest strength, continuous filament glass fibers are desirable. The laminations 12 are preferably impregnated with a varnish solution of a partially interpolymerized methallylsilicon compound and a saturated alkyl or aryl silicon compound. The laminations upon drying to remove the solvent are then cut to shape and stacked. The stacked laminations are then molded under pressure to predetermined form at suitable temperatures of from 70° C. to 200° C. or more, depending on the rapidity desired for the polymerization. A solid well bonded body is obtained by the process.

A particularly advantageous application for the interploymers of the present invention is their use as electrical insulation where their ability to withstand high temperatures for prolonged periods of time as compared to the known all-organic insulating materials is especially desirable.

Referring to Fig. 2 of the drawing, there is illustrated an insulated conductor 20 comprising a metallic conductor 22 and an insulating coating 24 of a polymerized methallyl siloxane applied thereto. The interploymers of a methallylsilicon compound and a saturated alkyl or aryl silicon compound polymerized to the state that they are relatively viscous while still soluble in a suitable hydrocarbon solvent may be applied to the conductor 22 in solution similar to a conventional wire enamel. The conductor may be immersed in a solution or dispersion of the siloxane and subjected to heat to first remove the hydrocarbon solvent and then to polymerize the resin. A polymerizing catalyst may be added in order to expedite the drying operation.

Referring to Fig. 3 of the drawing, there is shown an insulated conductor 26 comprising a metal conductor 22 carrying insulation 28. The insulation 28 comprises one or more layers of an inorganic fibrous material, such as asbestos fibers, cloth, or the like, or glass fibers in the form of staple fiber sliver, continuous filaments, yarn, tape or the like. Thereafter, the interstices of the fibrous material are impregnated with a varnish of methallyl siloxane or siloxane interpolymer or copolymer containing allyl and methyl groups attached to silicon.

Fig. 4 of the drawing illustrates the application of the interpolymers to a dynamo-electric machine. The stator 30 of a motor or generator, for example, comprising a plurality of laminations of magnetic material, contains a plurality of slots 32 machined in the laminations. The slots 32 are so machined that a narrow entering groove 34 is provided at the top to permit the introduction of conductors and the like and to facilitate retaining such conductors in the slots 32. Slot-cell liners 36 prepared from an inorganic material, such, for example, as glass-fiber cloth and coated with a methallyl siloxane interpolymer, are placed within the slots 32. Coils 38 and 40 are wound within the slot cell 32 lined with the insulating liner 36 according to the conventional practice. The conductors of the coils 38 and 40 are insulated with the methallyl siloxane interploymer described herein. The phase insulating separator 42 and the liner strip 44 may be made in a manner similar to the slot-cell liner 36 and applied to insulate the coils 38 and 40 from the rest of the apparatus. A wedge 46, which may be prepared from suitable inorganic materials, or, in some cases, from glass-fiber cloth impregnated with the polymeric resins of this invention and polymerized to shape under pressure, is driven into the top of the slot to retain the coils in their predetermined position.

In some cases, conductors may be insulated by coating with the partially polymerized interpolymer without requiring the preparation of a varnish solution thereof in a volatile solvent by extruding the viscous partial polymer about the conductor by means of a die.

In preparing polymeric bodies from the methallylsilicon compounds as well as interpolymers of methallyl silicon compounds, it may be desirable in many instances to embody therein finely divided inorganic materials, such, for example, as silica flour, bentonite, glass powders, calcium fluoride, ceramic powders and the like. A paste or thick liquid may be prepared from the silicon compound by incorporating a suitable amount of pulverized inorganic powder—for example, up to 50% by weight of the whole. The paste may be applied as a filler to electrical coils and other electrical apparatus. Upon heat treatment with or without a polymerizing catalyst, a hard, dense, solvent-resistant polmeric mass will be obtained. In other cases, the siloxane with the inorganic filler may be cast into suitable members for any application. They can be machined to shape.

The siloxane interpolymer embodying a proportion of methallylsilicon compound may be applied to mica flakes in solution in a solvent and thereafter drying out sheets or bodies built up therefrom to remove the solvent, molding to shape and completing polymerization of the siloxane into a hard, solvent-resistant state. Referring to Fig. 5 of the drawing, there is illustrated a sheet 50 composed of mica flakes bonded by means of the resinous polymers, copolymers or interpolymers having allyl and methyl groups attached to silicon atoms. The mica sheet may be prepared with a backing of an inorganic fibrous material such, for example, as glass fibers or asbestos in fabric form.

The several polymerizable methallylsilicon compounds described herein may be combined with finely divided graphite, anthracite coal or coke, either coal coke or petroleum coke heat treated at 500° C. to 700° C. to produce semi-conducting paints and varnishes. Such paints and varnishes are particularly useful for application to generators and other high voltage apparatus operating above 6900 volts to reduce or eliminate the generation of corona thereon. Both the anthracite coal and coke are stable at temperatures of 200° C. to 300° C. or even higher.

Since certain changes in carrying out the above processes and certain modifications in the apparatus and applications embodying the materials produced by the processes of the invention may be made without departing from its scope, it is intended that all matter contained in the above description or shown in the accompanying drawing shall be interpreted as illustrative and not in a limiting sense.

We claim as our invention:

1. A composition of matter comprising a heat-treated monovalent hydrocarbon-substituted polysiloxane wherein the hydrocarbon radicals consist of methallyl and methyl radicals linked directly to the silicon atoms by carbon-to-silicon linkages and wherein no polysiloxane silicon atom is linked directly to both methallyl and methyl radicals by carbon-to-silicon linkages, the methallyl radicals being attached to from about 0.1% to 16% of the total number of silicon atoms, the remaining silicon atoms having not over 2 methyl groups attached to each, the ratio of hydrocarbon groups to silicon atoms being less than 2, the heat-treated polysiloxane being characterized by both siloxane linkages and cross-linkages through reaction between methallyl groups.

2. A composition of matter comprising a heat-treated monovalent hydrocarbon-substituted polysiloxane wherein the hydrocarbon radicals consist of methallyl, phenyl, and methyl radicals linked directly to the silicon atoms by carbon-to-silicon linkages and wherein no polysiloxane silicon atom is linked directly to both methallyl and either phenyl or methyl radicals by carbon-to-silicon linkages, the methallyl radicals being attached to from about 0.1% to 16% of the total number of silicon atoms, the remaining silicon atoms having not over a total of two phenyl and methyl groups attached to each, the ratio of hydrocarbon groups to silicon atoms being less than 2, the heat-treated polysiloxane being characterized by both siloxane linkages and cross-linkages through reaction between methallyl groups.

3. A composition comprising essentially a partially condensed mixture of (a) methallyl silicon oxide groups, each silicon atom in these groups having from one to two methallyl radicals directly attached thereto by C—Si bonds, and (b) the balance comprising methyl silicon oxide groups, each silicon atom in these latter groups having from one to two methyl radicals directly attached thereto by C—Si bonds, the methallyl silicon oxide groups providing from 0.1% to 16% of the total number of silicon atoms in the mixture and the balance of the silicon atoms being supplied by the methyl silicon oxide groups, the composition being free of volatile solvent and being substantially completely polymerizable to a solid by heat treatment.

4. A solid heat-treated interpolymer of (a) a methallyl silsesquioxane and (b) the balance being an organic siloxane whose organic radicals attached directly to silicon are selected from the group consisting of saturated alkyl and aryl radicals, there being an average of from one to two organic groups attached to silicon in the latter siloxane, the methallyl silsesquioxane providing from about 0.1% to 16% of the silicon atoms in the interpolymer, the interpolymer characterized by both Si—O—Si linkages and cross-linkages through methallyl groups.

JACK SWISS.
CLYDE E. ARNTZEN.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,377,689 | Hyde | June 5, 1945 |
| 2,386,793 | Hanford | Oct. 16, 1945 |
| 2,397,727 | Daudt | Apr. 2, 1946 |
| 2,409,633 | Kropa | Oct. 22, 1946 |
| 2,413,582 | Rust | Dec. 31, 1946 |
| 2,436,304 | Johannson | Feb. 17, 1948 |
| 2,450,594 | Hyde | Oct. 5, 1948 |
| 2,457,677 | Hyde | Dec. 28, 1948 |
| 2,486,162 | Hyde | Oct. 25, 1949 |

OTHER REFERENCES

Hurd: Journ. Amer. Chem. Soc., October 1945, vol. 67, pp. 1813 and 1814.

Andrianov: J. Gen. Chem. (U. S. S. R.), vol. 8, No. 10, pp. 969–971 (1938).